United States Patent [19]

Gilkey et al.

[11] Patent Number: 4,802,980
[45] Date of Patent: Feb. 7, 1989

[54] AQUARIUM FILTER

[76] Inventors: Charlotte E. Gilkey; Hazel E. Gilkey, both of P.O. Box 272, Dixon, Ill. 61021

[21] Appl. No.: 120,963
[22] Filed: Nov. 16, 1987
[51] Int. Cl.$^4$ ............................................. A01K 63/04
[52] U.S. Cl. .................................. 210/169; 210/416.2; 119/5
[58] Field of Search ................. 210/169, 416.2; 119/3, 119/5

[56] References Cited

U.S. PATENT DOCUMENTS

| | | | |
|---|---|---|---|
| 1,965,323 | 4/1932 | Taslitt | 119/5 |
| 3,687,291 | 8/1972 | Willinger | 210/169 |
| 3,841,999 | 10/1974 | Bennett et al. | 210/169 |
| 3,891,555 | 6/1975 | Bennett et al. | 210/169 |
| 4,144,841 | 3/1979 | Bliss et al. | 210/169 |
| 4,351,270 | 9/1982 | Sabin | 119/5 |
| 4,385,989 | 5/1983 | Margolis | 210/169 |
| 4,392,953 | 7/1983 | Cornelius et al. | 210/169 |
| 4,556,485 | 12/1985 | Ogawa | 210/169 |
| 4,606,821 | 8/1986 | D'Imperio | 210/169 |
| 4,693,817 | 9/1987 | Goldman et al. | 210/169 |

Primary Examiner—Richard V. Fisher
Assistant Examiner—Coreen Y. Lee
Attorney, Agent, or Firm—Jerry T. Kearns

[57] ABSTRACT

A dual action aquarium filter has a slotted base for placement in the bottom of an aquarium. The base is covered with gravel, allowing water to be filtered through the gravel and into the interior of the base. A tube extends upwardly from the base and is connected to a filtration device containing charcoal and fibrous filter material for a secondary filtering of the aquarium water. The secondary charcoal and fiber filter is contained within a disposable portion of the upwardly extending tube. A motor is mounted on top ofo the tube and is connected to a pump impeller for circulating water up through the tubular filter. Outlet holes are provided beneath the motor for returning the filtered water to the aquarium. In a second embodiment, the secondary charcoal and fiber filter is contained in a removable filter basket disposed above the pump impeller. Water is driven up the tube by the impeller and is allowed to overflow into the filter basket. The filter basket is perforated to allow filtered water to pass into an annular outlet channel and back into the aquarium. In a third embodiment of the present invention, a vacuum pump is mounted outside the aquarium and draws water up through a filter canister and returns the water to the aquarium through a spray head. This provides an aesthetic effect and also enhances aeration of the filtered water.

5 Claims, 5 Drawing Sheets

AQUARIUM FILTER

BACKGROUND OF THE INVENTION

1. Field of the Invention

The present invention relates to aquarium filters, and more particularly pertains to a new and improved dual action aquarium filter. Conventional aquarium filters utilize an external pump and filter canister. The contents of the filter canister must be periodically replaced with fresh charcoal and filter fiber. This is a messy and unpleasant task. Additionally, the conventional types of aquarium filters create a cluttered environment around the exterior of the aquarium. The present invention overcomes these problems by providing a dual action aquarium filter which provides a first filtration through gravel and a second charcoal and fiber filtration. The pump motor and filter canister are mounted within the aquarium and are easily accessible for replacement and cleaning.

2. Description of the Prior Art

Various types of aquarium filters are known in the prior art. A typical example of such an aquarium filter is to be found in U.S. Pat. No. 2,674,574, which issued to C. Pettas on April 6, 1954. This patent utilizes a hollow upstanding tube attached to a bell shaped fiber filter canister designed to be placed on the bottom of the interior of an aquarium. A compressed air inlet in the hollow tube is utilized to create an aspiration type pump to circulate water through the bell shaped filter canister and out a top portion of the hollow tube above the water level in the aquarium. U.S. Pat. No. 2,676,921, which issued to M. Vansteenkiste on April 27, 1954, discloses an aquarium filter which utilizes a fiber and charcoal filter buried in the bottom gravel of an aquarium. An external air pump is utilized to provide an aspiration pump effect to circulate water through the bottom filter. U.S. Pat. No. 3,225,930, which issued to A. Willinger on Dec. 28, 1965, discloses a portable aquarium cleaning device. A hollow cylindrical tube has a pump impeller rotated by a drive shaft driven by an electric motor mounted on an end of the hollow tube. An outlet from the pump is connected to a cloth filter bag. In use, gravel in the bottom of an aquarium is agitated by moving the distal end of the tube and water and waste particles are drawn upwardly through the tube by the pump impeller. The water and waste are then discharged through an outlet where the waste particles are filtered out by the cloth filter bag. U.S. Pat. No. 3,549,015, which issued to A. Willinger on Dec. 22, 1970 discloses a hand operated aquarium cleaning pump. A hand actuated squeeze pump is utilized to draw water from adjacent the bottom gravel of an aquarium tank through a hollow cylindrical tube and discharge the water through an outlet filter bag. U.S. Pat. No. 4,606,821, which issued to D. D'Imperio on Aug. 19, 1986, discloses an aquarium with an integral waterfall type filter. The aquarium is divided into an aquarium compartment and a mechanical filtering chamber. The filtering chamber contains filters and a reservoir. Water enters the aquarium from the reservoir through piping and is released from the aquarium compartment to the mechanical filter chamber by waterfall action. Water is continually in circulation between the sections.

While the above mentioned devices are suited for their intended usage, none of these devices provide an aquarium filter with easily cleanable and replaceable filter sections. Additionally, none of the aforesaid aquarium filters provide an easily cleanable waterfall type filter basket disposed above water level on an inlet pipe. Another feature of the present invention not disclosed by the prior art aquarium filters is the use of a vacuum type pump in conjunction with a disposable filter canister and a hollow slotted base to provide dual action filtration and aerated discharge of water through a spray nozzle. Inasmuch as the art is relatively crowded with respect to these various types of aquarium filters, it can be appreciated that there is a continuing need for and interest in improvements to such aquarium filters, and in this respect, the present invention addresses this need and interest.

SUMMARY OF THE INVENTION

In view of the foregoing disadvantages inherent in the known types of aquarium filters now present in the prior art, the present invention provides an improved aquarium filter. As such, the general purpose of the present invention, which will be described subsequently in greater detail, is to provide a new and improved aquarium filter which has all the advantages of the prior art aquarium filters and none of the disadvantages.

To attain this, representative embodiments of the concepts of the present invention are illustrated in the drawings and make use of a hollow slotted base connected to a hollow upstanding cylindrical water conduit. The hollow slotted base is designed to be placed in the bottom of an aquarium and covered with gravel to create a first filtration of the aquarium water through the gravel. In a first embodiment of the present invention, the hollow cylindrical water conduit has a disposable or refillable charcoal and fiber filter section. A pump impeller is mounted for rotation above the filter section of the water conduit. A pump mounted above water level on the end of the water conduit drives the pump impeller. In a second embodiment of the invention, a removable filter basket is provided on an upper portion of the water conduit. The filter basket contains fiber and charcoal filtering agents. Water is circulated through the filter basket by a waterfall action which provides for aeration of the aquarium water. In a third embodiment of the present invention, a vacuum type pump is mounted by a clamp on an exterior side wall of an aquarium. Water is drawn through an upwardly extending hollow cylindrical filter canister and returned and aerated by a spray nozzle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved aquarium filter which has all the advantages of the prior art aquarium filters and none of the disadvantages.

It is another object of the present invention to provide a new and improved aquarium filter which may be easily and efficiently manufactured and marketed.

It is a further object of the present invention to provide a new and improved aquarium filter which is of a durable and reliable construction.

An even further object of the present invention is to provide a new and improved aquarium filter which is susceptible of a low cost of manufacture with regard to both materials and labor, and which accordingly is then susceptible of low prices of sale to the consuming public, thereby making such aquarium filters economically available to the buying public.

Still yet another object of the present invention is to provide a new and improved aquarium filter which provides in the apparatuses and methods of the prior art some of the advantages thereof, while simultaneously overcoming some of the disadvantages normally associated therewith.

Still another object of the present invention is to provide a new and improved dual action aquarium filter which utilizes a hollow slotted base designed to be covered with gravel in the bottom of an aquarium to provide a first filtration effect and a charcoal and fiber filter to provide a second filtration effect.

Yet another object of the present invention is to provide a new and improved dual action aquarium filter which utilizes an upstanding hollow cylindrical water conduit provided with a waterfall type filter basket for filtering and aerating aquarium water.

Even still another object of the present invention is to provide a new and improved aquarium filter which utilizes an externally mounted vacuum pump for drawing water through an upstanding cylindrical filter canister and returning and aerating the water through a spray nozzle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
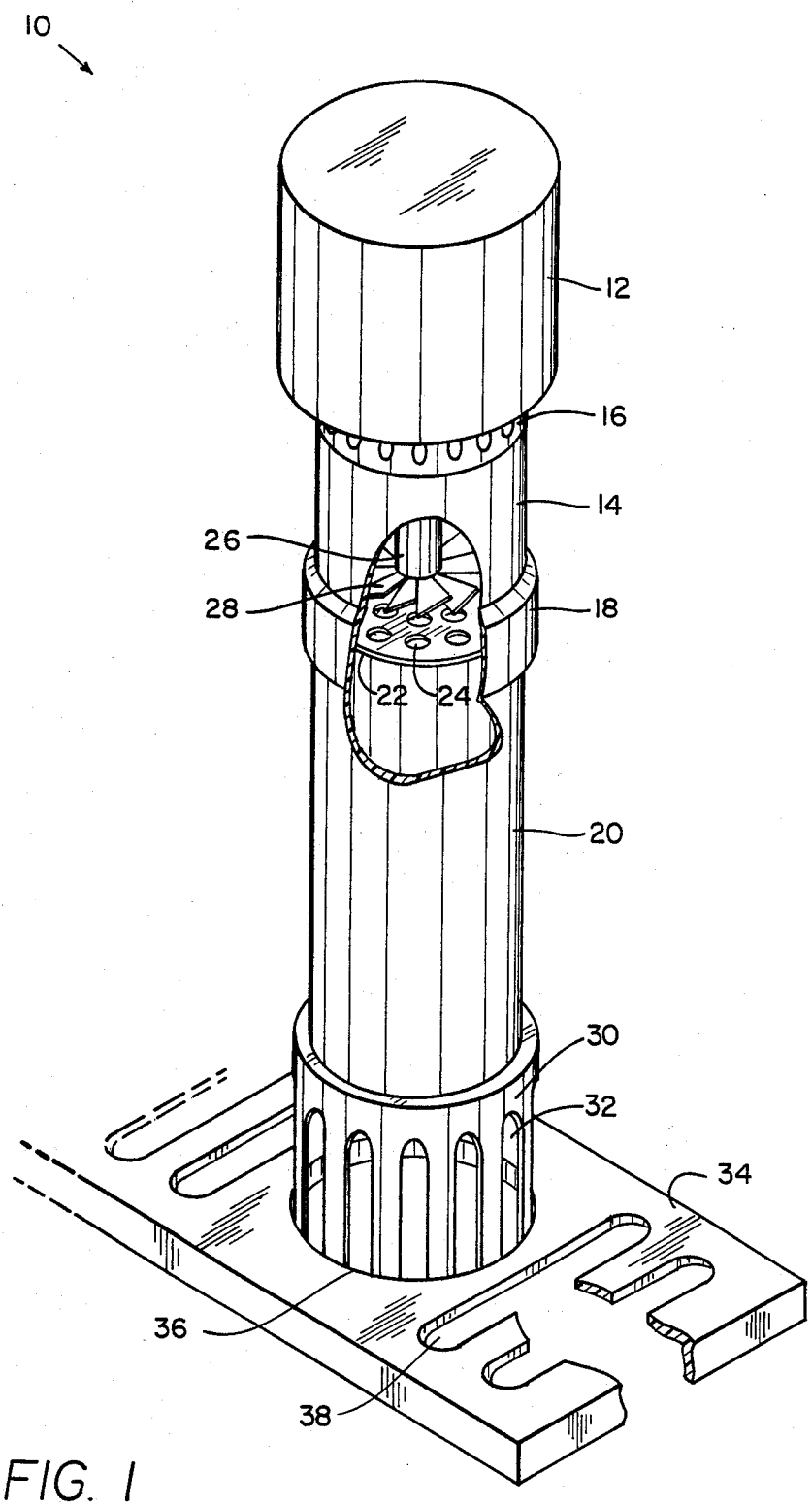
FIG. 1 is a perspective view, partially cut away, illustrating an aquarium filter according to a first embodiment of the present invention.

With reference now to the drawings, and in particular to FIG. 1 thereof, a new and improved aquarium filter embodying the principles and concepts of the present invention and generally designated by the reference numeral 10 will be described.

More specifically, it will be noted that the first embodiment 10 of the invention includes a motor 12 mounted on an upper end 14 of a hollow cylindrical water conduit. An array of outlet holes 16 extend around the top of the upper portion 14 of the hollow water conduit. An annular over fitting joint 18 connects the upper portion 14 with a lower portion 20 of the water conduit. A shield plate 22 is provided with a plurality of apertures 24 for allowing water to be drawn through the plate 22 by a pump impeller 28. The shield plate 22 prevents debris from coming in contact with the pump impeller 28. The impeller 28 is connected for rotation by a drive shaft 26 of the motor 12. The lower portion 20 of the water conduit forms a filter canister which is packed with charcoal and fibrous filter materials. The lower portion of the water conduit 20 is received within a circular connector 30. The circular connector 30 is attached to a generally rectangular hollow base plate 34. The base plate 34 is provided with a plurality of slots 38 to allow water to be drawn into the hollow interior of the base plate. The cylindrical connector 30 is provided with a plurality of slots 32 for the same purpose. The cylindrical connector 30 is mounted within a central circular aperture 36 in the base plate 34. In use, the base plate 34 is placed in the bottom of an aquarium and covered with gravel. Water is then drawn through the slots 32 and 38 and upwardly through the filter portion 20 of the water conduit by the pump impeller 28. The water level in the aquarium is above the level of the impeller 28, but below the level of the outlet hole 16. Water is thus filtered and drawn upwardly through the holes 24 in the shield plate 22 and exhausted through outlet holes 16. This creates a pleasing fountain effect which also serves to aerate the water.

Figure 2:
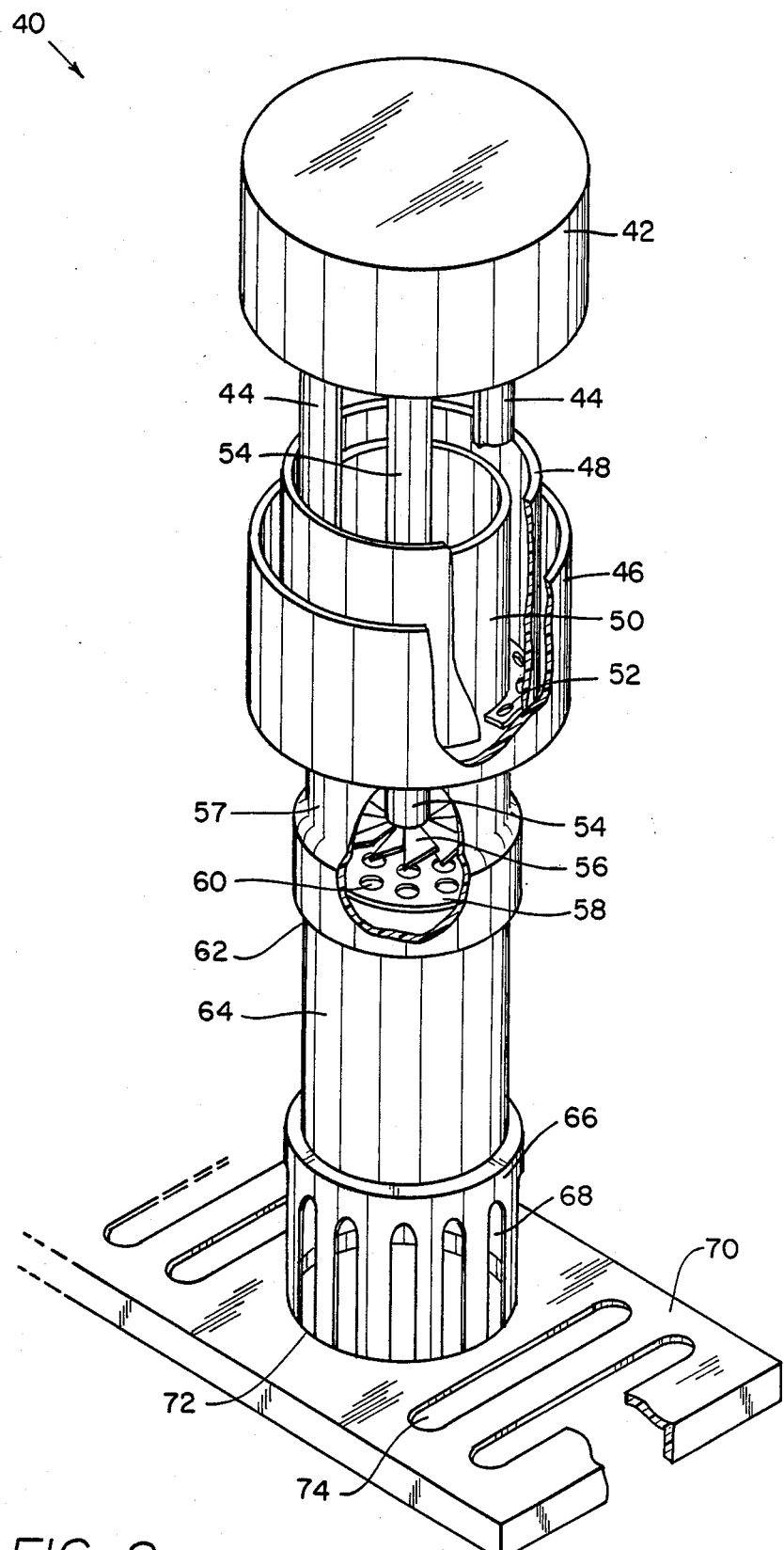
FIG. 2 is a perspective view, partially cut away, illustrating an aquarium filter according to a second embodiment of the present invention.

With reference now to FIG. 2, a second embodiment of an aquarium filter according to the present invention will now be described. The second embodiment of the aquarium filter 40 is generally similar in construction to the first embodiment 10. A generally rectangular hollow base plate 70 is provided with a plurality of water intake slots 74. A cylindrical connector 66 is mounted in a central circular aperture 72 in the base plate 70. A plurality of water intake slots 68 extend around the periphery of the cylindrical connector 66. A hollow cylindrical water conduit 64 is provided with an annular connector 62 for receiving an upper portion 57 of the water conduit. A drive shaft 54 of a motor 42 is connected to a pump impeller 56 for drawing water upwardly through apertures 60 in a shield plate 58. Water is then forced upwardly through a top portion 50 of the water conduit and is allowed to overflow in a waterfall fashion into a filter basket 48. The filter basket 48 contains charcoal and fibrous filter materials. Water is allowed to pass through the filter basket 48 and be exhausted through a plurality of circumferentially spaced holes 52 in the bottom of the filter basket 48 into an annular outlet chamber 46. Water then rises up the level of the interior of the annular outlet chamber 46 and spills over the top and back into the aquarium. The motor 42 is supported by a pair of support struts 44. By this construction, the impeller 56 will be situated below water level and the filtration basket 48 and motor 42 will be situated above water level. The motor 42 is connected to the filtration basket 48 by the support struts 44; thus the filtration basket 48 and the motor 42 may be removed as a unit for the cleaning of the filter basket 48.

Figure 3:
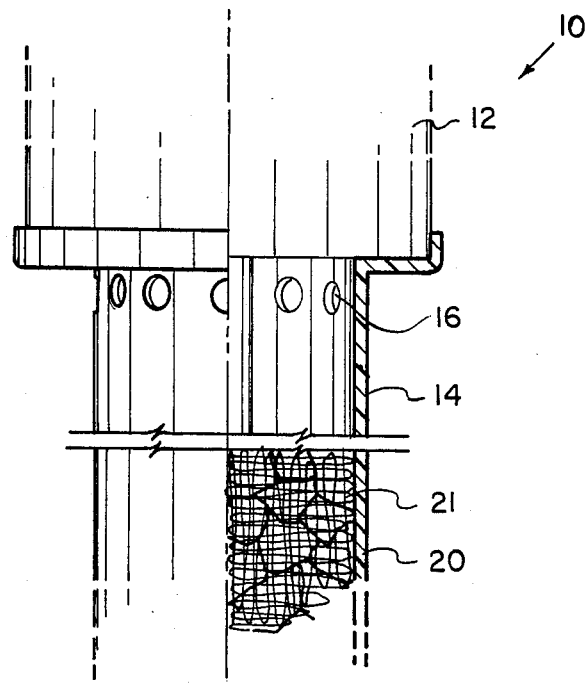
FIG. 3 is a front view, partially in cross section, illustrating the aquarium filter according to the first embodiment of the present invention.

With reference now to FIG. 3, it may be seen that the lower portion 20 of the water conduit of the first embodiment 10 of the present invention is packed with conventional charcoal and fibrous filter materials 21. The filter canister 20 may be easily removed and repacked, or may be disposed of and replaced with a prepacked filter canister unit.

Figure 4:
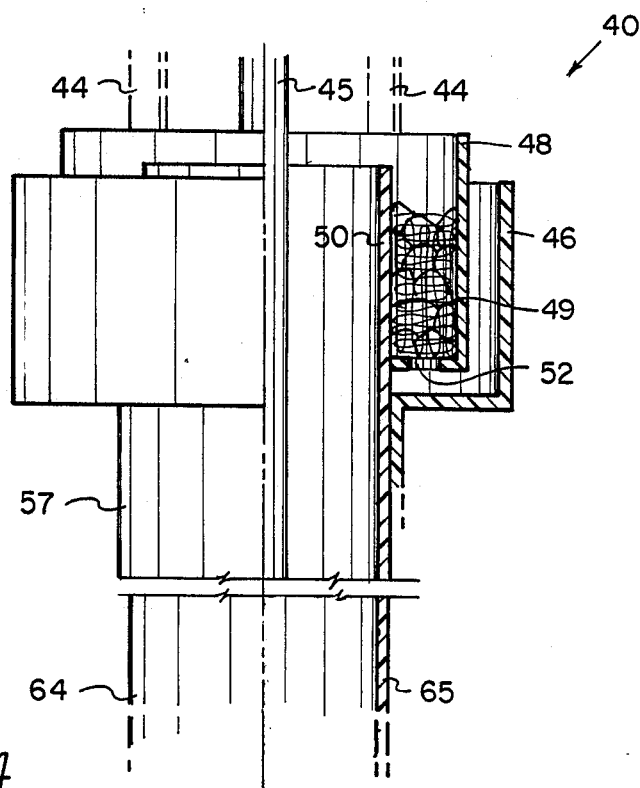
FIG. 4 is a front view, partially in cross section, illustrating the aquarium filter according to the second embodiment of the present invention.

With reference now to FIG. 4, it may be seen that in the second embodiment 40 of the present invention, water is drawn upwardly through the hollow interior 65 of the lower portion 64 of the water conduit, through the upper portion 50 and is then allowed to spill over into the filter basket 48. The water flows by gravity outwardly through the apertures 52 provided in the bottom of the filter basket 48. The water is then forced upwardly by the pressure of water within the filter basket 48 through the annular outlet chamber 46. Water then spills over the top side of the outlet chamber 46 and falls back into the aquarium. Charcoal and fibrous filter materials 49 are received within the filter basket 48.

Figure 5:
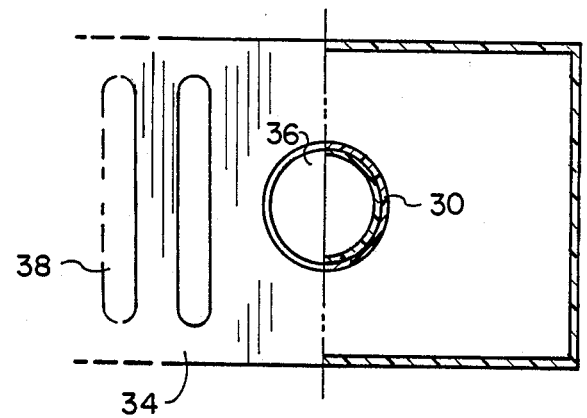
FIG. 5 is a top plan view, partially in cross section, illustrating the hollow slotted base of the aquarium filters of the present invention.

With reference now to FIG. 5, it may be seen that the hollow rectangular base 34 of the present invention is provided with a central circular aperture 36 in which the cylindrical connector 30 is situated. The hollow rectangular base plate 70 of the second embodiment of the present invention is constructed in analogous fashion.

Figure 6:
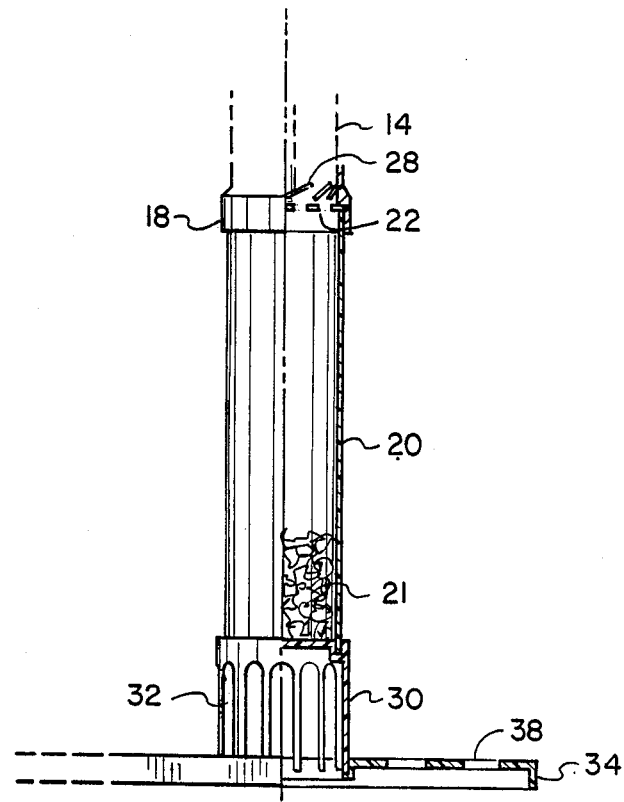
FIG. 6 is a side view, partially in cross section, of a portion of the aquarium filter according to the first embodiment of the present invention.

With reference now to FIG. 6, it may be understood that the bottom portion 20 of the water conduit may be formed as a disposable, replaceable filter canister. In this manner, aquarium owners need not undertake the messy and time consuming task of repacking the filter canister 20 with the charcoal and fibrous filter material 21.

Figure 7:
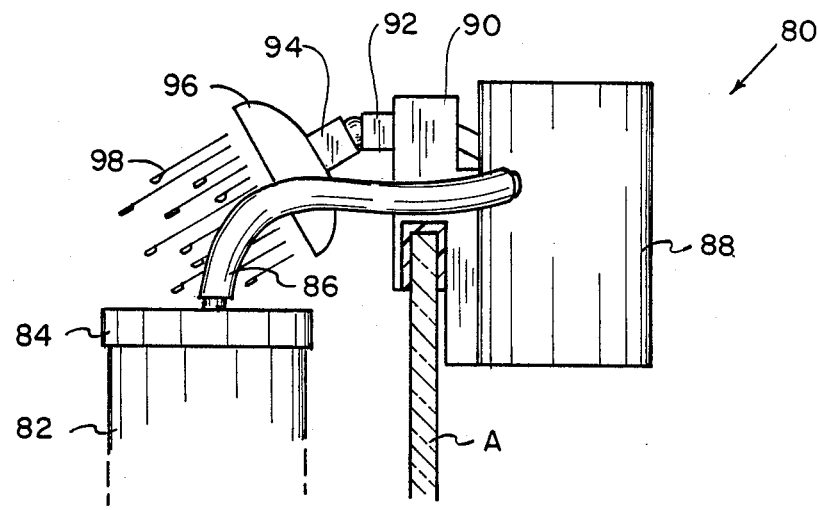
FIG. 7 is a side view of an aquarium filter according to a third embodiment of the present invention.

With reference now to FIG. 7, a third embodiment 80 of the aquarium filter of the present invention will now be described. A cylindrical water conduit and filter canister 82 utilizes a hollow slotted base buried in aquarium gravel on the bottom of the aquarium in the same fashion as described with respect to the first and second embodiments of the present invention. The filter canister and water conduit 82 may be provided with a disposable filter canister as illustrated in FIG. 6. A top lid portion 84 of the conduit 82 is provided with an outlet connected to an inlet tube 86 of a vacuum type pump 88. The vacuum type pump 88 is secured by a clamp 90 to the top side wall of an aquarium A. The outlet side of the pump 88 is connected by a tube 92 to a swivel mounted spray head 96. This aerates and returns water 98 to the aquarium.

Figure 8:
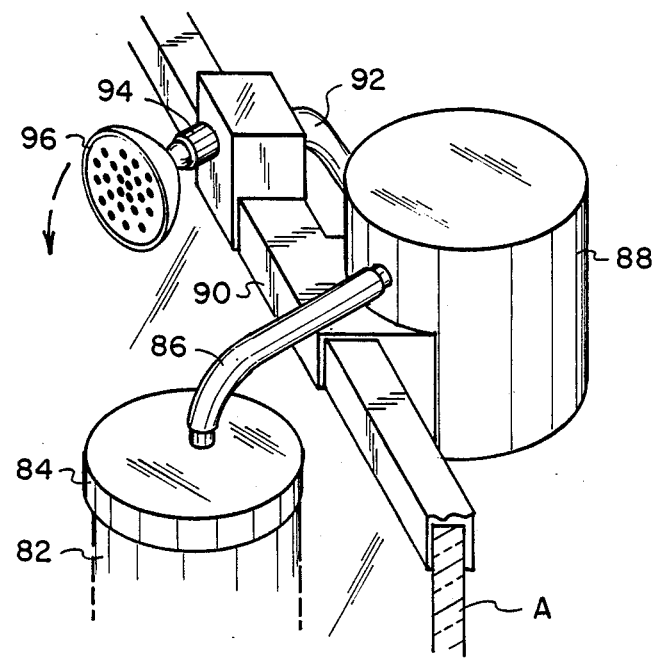
FIG. 8 is a perspective view of the aquarium filter according to the third embodiment of the present invention.

As shown in perspective in FIG. 8, the clamp 90 engages the top portion of the side wall of an aquarium A. The pump 88 is supported on the outside of the side wall. By adjusting the swivel connection 94, the output of the spray head 96 may be directed in any desired direction. This provides an aesthetic effect as well as an enhanced aeration of the filtered water.

The various components of the present invention are preferably constructed from a rigid molded plastic, although any conventional material may be utilized.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the at, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An aquarium filter, comprising:
    a hollow base (34) adapted to be covered with gravel in the bottom of an aquarium and having;
    a plurality of water intake slots (38) in said base;
    a cylindrical upstanding connector (30) communicating with the hollow interior of said base and having;
    a plurality of vertical slots (32) disposed circumferentially around said connector;
    an upstanding water conduit removably received in said connector and having a lower portion (20),
    fiber and charcoal filter means (21) in said lower portion of said water conduit;
    a top portion (14) of said water conduit removably connected by an annular over fitting joint (18) to said lower portion;

a motor (12) mounted on an upper end of said top portion of said water conduit;

a drive shaft (26) of said motor extending axially within said top portion;

a pump impeller (28) mounted on said drive shaft;

an apertured (24) shield plate (22) in said water conduit, beneath said pump impeller;

means defining a plurality of outlet holes (16) extending circumferentially around said top portion of said water conduit; and said outlet holes being above said pump impeller and beneath said motor.

2. The aquarium filter of claim 1, wherein said lower portion of said water conduit comprises a disposable or refillable filter canister.

3. An aquarium filter, comprising:

a hollow base (70) adapted to be covered with gravel in the bottom of an aquarium and having;

a plurality of water intake slots (74) in said base;

a cylindrical upstanding connector (66) communicating with the hollow interior of said base;

a plurality of vertical slots (68) disposed circumferentially around said connector;

an upstanding water conduit removably received in said connector and having a lower portion (64), an upper portion (57) of said water conduit removably connected by an annular over fitting joint (62) to said lower portion;

a filter basket (48) removably received around a top portion (50) of said water conduit;

said filter basket containing charcoal and fiber filter material (49) and having an apertured bottom (52);

said filter basket forming an open annular space around said top portion of said water conduit;

an annular outlet chamber (46) surrounding said filter basket;

a motor (42) connected by support struts (44) to said filter basket;

said motor having a drive shaft (54) extending axially within said top portion of said water conduit;

a pump impeller (56) mounted on said drive shaft beneath said filter basket;

an apertured (60) shield plate (58) in said water conduit below said pump impeller.

4. An aquarium filter, comprising:

a hollow base (34) adapted to be covered with gravel in the bottom of an aquarium;

a plurality of water intake slots (38) in said base;

a cylindrical upstanding connector (30) communicating with the hollow interior of said base and having;

a plurality of vertical slots (32) disposed circumferentially around said connector;

an upstanding water conduit (82) and having a lower portion removably received in said connector, fiber and charcoal filter means (21) in said water conduit;

a top lid portion (84) removably received on a top end of said water conduit;

a vacuum type pump (88) having an inlet side (86) connected to and disposed above said top lid portion of said water conduit;

clamp means (90) secured to said vacuum pump for mounting said vacuum pump on an exterior side wall of an aquarium;

a swivel spray head (96) mounted on a side of said clamp means opposite said pump and adapted to be disposed on an interior side wall of an aquarium; and an output side (92) of said vacuum pump connected by a ball and socket joint (94) to said swivel spray head for returning and aerating water to an aquarium.

5. The aquarium filter of claim 4, wherein said water conduit comprises a disposable or refillable filter canister.

* * * * *